Dec. 27, 1949 E. H. MEBS Re. 23,185

APPARATUS FOR CASTING STEEL ROLLS

Original Filed May 22, 1945 2 Sheets-Sheet 1

Inventor:
ERWIN H. MEBS,
by: John E. Jackson
his Attorney.

APPARATUS FOR CASTING STEEL ROLLS

Original Filed May 22, 1945 2 Sheets-Sheet 2

Inventor:
ERWIN H. MEBS,
by: John E. Jackson
his Attorney.

Reissued Dec. 27, 1949 Re. 23,185

UNITED STATES PATENT OFFICE 23,185

APPARATUS FOR CASTING STEEL ROLLS

Erwin H. Mebs, Alliance, Ohio, assignor to Carnegie-Illinois Steel Corporation, a corporation of New Jersey Original No. 2,431,879, dated December 2, 1947, Serial No. 595,091, May 22, 1945. Application for reissue June 21, 1949, Serial No. 100,501

2 Claims. (Cl. 22—134)

Matter enclosed in heavy brackets [ ] appears in the original patent but forms no part of this reissue specification; matter printed in italics indicates the additions made by reissue

The present invention relates to an improved method and apparatus for casting ferrous metal objects while in vertical upright position.

One object of the invention is to provide a method and means to minimize the tendency of vertically cast ferrous metal articles to crack or break adjacent the top portion of the casting while in hot condition.

Another object is to provide a method and apparatus for casting ferrous metal articles in such manner that there is provided during the casting operation a localized plane of weakness in a predetermined plane whereby if breakage or cleavage takes place during the solidification of the casting, it will occur at or closely adjacent to said predetermined plane of weakness.

A further object of the invention is to provide a method of casting ferrous metal objects in such manner that during solidification of the metal a zone of weakness is maintained at a predetermined plane below the fluid metal so as to localize the tendency to form hot tears at said localized zone of weakness.

For a more complete understanding of the invention, reference should be made to the following detailed disclosure, the accompanying drawings, and the appended claims.

Figure 1:
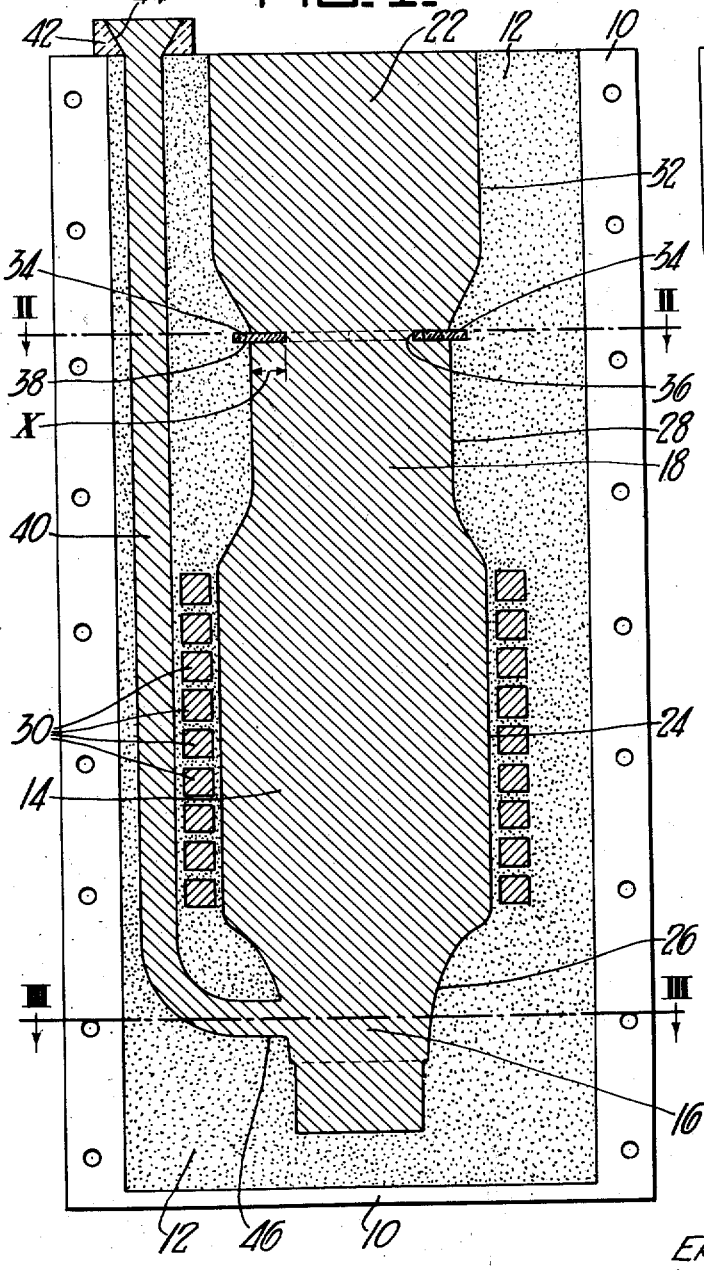
Figure 1 is a longitudinal section through a novel form of apparatus for carrying out the herein claimed method.

Referring more particularly to the drawings, Figure 1 represents a vertical elevation of one half of the mold. The complete mold consists of two duplicate flask sections 10—10 suitably secured in assembled relation, each section having a body of mold material therein such as highly bonded silica sand, indicated at 12, the mold cavities being formed either by the use of a conventional split pattern or by the conventional sweep method.

Figure 4:
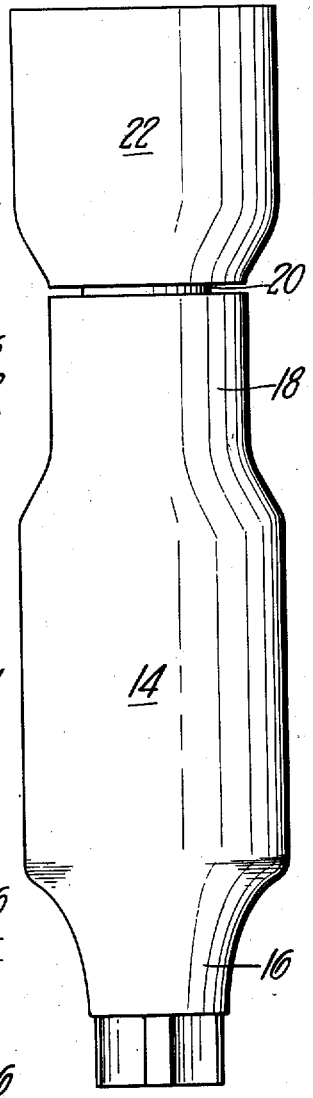
Figure 4 is an elevational view of a mill roll cast according to the teachings of the present invention.
Figure 2:
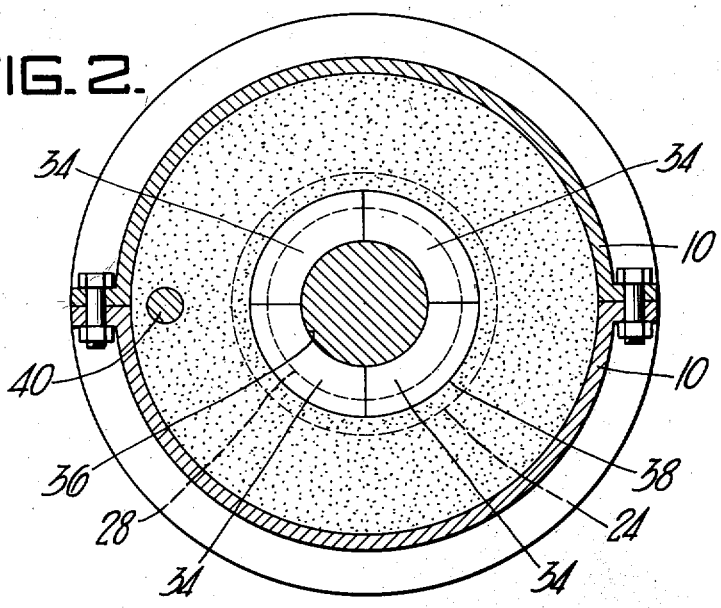
Figure 2 is a cross section on line II—II of Figure 1.

While not limited thereto, the present invention is well suited for the casting of iron or steel rolling mill rolls or heavy pinions. By way of example, I have shown in Figure 4 a rolling mill roll having an intermediate roll portion 14 of an enlarged diameter, a lower neck portion 16 of smaller diameter, and an upper neck portion 18 of a diameter smaller than the portion 14. In casting such articles in upright position, a problem occurs which is occasioned by the tendency of drastic chilling action to cause the formation of hot tears in the upper region of the article. As will appear more fully hereinafter, under my invention I provide a method and means wherein a zone of weakness is provided such as indicated at 20 in Figure 4, above the upper end of the casting ultimately produced. Above this zone of weakness in the formation of the casting there is produced a portion indicated at 22 which is normally cropped off and discarded.

In the practice of the invention, the mold for producing rolling mill rolls or pinions is provided with an intermediate mold cavity 24 of relatively large diameter which at the bottom opens into a cavity of smaller diameter, indicated at 26, and which at the top opens into a cavity of smaller diameter 28. Surrounding the intermediate cavity 24 of large diameter I provide a plurality of metal rings 30 which serve to chill the molten metal during the casting operation.

Above the upper cavity 28 I provide a riser cavity 32. It is apparent from the drawings that the cavities 26 and 28 correspond to the lower and upper reduced diameter neck portions 16 and 18 of the roll, shown in Figure 4, and that the cavity 24 corresponds to the roll body portion 14 of enlarged diameter of Figure 4. Similarly, the riser portion 32 of the mold corresponds to the portion 22 of Figure 4.

A particular and essential feature of the herein claimed invention relates to the method and means for creating the zone of weakness in the article during the casting thereof. This is accomplished by incorporating in the mold means such as indicated at 34, for forming a restricted orifice 36 in a predetermined plane between the upper mold cavity 28 and the riser cavity 32. The means may be in the nature of a disc or slab of any material of sufficient strength and refractoriness, seated in an annular groove or trench 38 formed in the mold. The disc-like member 34 may be made of kiln-dried fire clay either in a single disc-like perforated piece, or it may be formed of a plurality of arcuate segments. The means 34 which provides the restricted orifice fits in a trench 38, is held in place by the sand, and projects a definite predetermined distance (marked X) inwardly into the region between the mold cavity 28 and the riser cavity 32.

Figure 3:
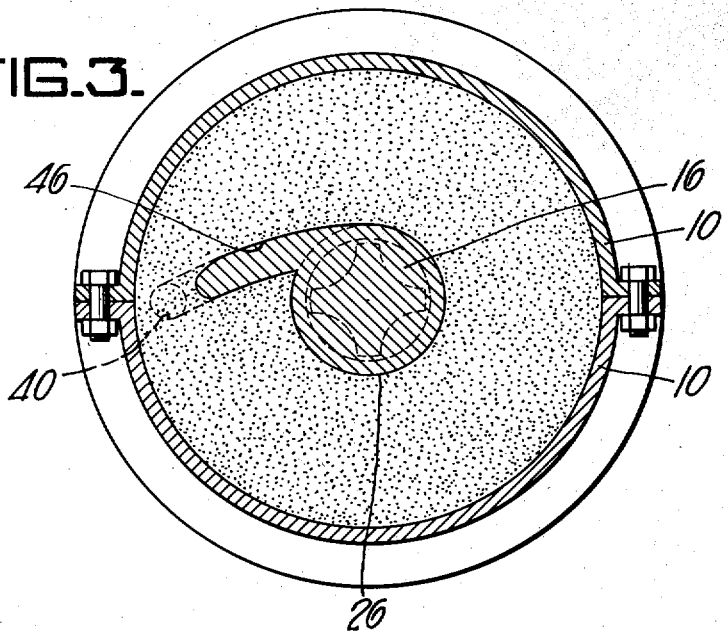
Figure 3 is a cross section on line III—III of Figure 1.

The mold is formed with an upright vertical gate 40, and at the top is equipped with a runner cup 42 having a flared opening 44 into which the molten metal is teemed from a suitable ladle. As best shown in Figure 3, the bottom of the gate has a laterally extending portion 46 which connects tangentially with the lower mold cavity 26. In casting rolls or pinions according to my improved method, the ladle of molten metal is stationed directly above the runner cup 42 and the stopper of the ladle raised to permit the stream of molten metal to enter the runner cup in the usual manner. The stream of molten metal therefore flows through the gate 40. The pouring rate is maintained relatively slow until the mold cavity 26 is filled approximately to the level of the tangential entrance 46. Thereupon the pouring ladle nozzle is opened wide and the full stream is permitted to enter the mold through the gate. The metal first rises through the lower cavity 26 and the intermediate cavity 28 in the mold with a spinning motion due to the tangential entry. Any dirt or foreign matter picked up by the stream of rising molten metal is retained in the center of the mold due to the cupping effect and centripetal action, the dirt or foreign matter being lighter than the metal. As the top surface of molten metal rising within the mold approaches the means 34 incorporated in the mold, the spinning action is materially decreased. Therefore when the metal rises through the restricted orifice 36 over the means 34 and proceeds to fill the riser cavity 32, advantageously there is very little action due to trapped air and no formation of vacuum.

Immediately following the pouring of the mold, steps are preferably taken to keep the metal in the riser cavity 32 molten so that there will be a sufficient storage of liquid metal for a considerable period of time, to feed the casting metal properly. This may be accomplished by covering the metal in the riser portion with a finely powdered exothermic material or with an insulating medium, or by the incorporation of carbon rods horizontally across the mold about midway of the riser portion or by the addition of extra hot molten metal at frequent intervals.

A problem overcome by the invention is the prevention of hot tears such as frequently occur in the top parts of large articles cast in vertical upright position. In such upright cast articles there is always danger of cracks or hot tears forming at the stage when the metal is at the tender condition known to occur at a temperature of approximately 2350° F. Heretofore hot tearing has been particularly noticeable in the region corresponding to the upper roll neck 18 of Figure 4. It is believed to be caused by some sort of holding action within the mold, and I have determined that when castings of this kind solidify in vertical position there is a very considerable linear contraction amounting to as much as $\frac{3}{16}$ of an inch per foot. The metal must be free to shrink. If the gate at the bottom or a fin at the top holds the metal as it solidifies at such locations, the casting is not permitted to contract freely as it freezes and therefore it is amenable to the formation of hot tears. This tendency to hot tearing is particularly noticeable in the casting of rolling mill rolls which are desirably chilled at the large diameter intermediate portion. By the use of my improved mold and in following the method steps of my invention, the chill within the mold serves as a means for holding the metal during solidification, and in conjunction with the ringlike disc 34 restricts the formation of hot tears to a definite predetermined zone of weakness in the region of the said means 34 having the restricted orifice 36 therein. By holding the metal during the solidification I refer to the restraint of the natural contraction caused by adhesion of the casting surface to the surrounding compacted sand of the mold. Such restraint or holding of the metal is accentuated by the chills which cause a very rapid cooling and rapid contraction of one portion of the casting while another portion thereof is in a semi-plastic state. This holding action is particularly noticeable where said semi-plastic portion is of reduced cross section. It is clear, therefore, that the invention provides for confining the region of hot tearing to a definite and predetermined zone, thus insuring that the working parts of the casting are thoroughly sound and homogeneous. The creation of the zone of weakness has the added advantage of providing means for breaking off the cropped portion 22 formed in the riser cavity 32 of the mold.

While I have described quite precisely a specific mold and a casting procedure which an actual reduction to practice has demonstrated to be highly desirable, it is not to be construed that I am limited thereto, since various modifications may be made by those skilled in the art within the scope of the appended claims.

I claim:

1. In a mold for casting steel rolls including a bonded sand body and chill members, said sand body having an upright cylindrical cavity of relatively large diameter in which the roll body is formed, top and bottom cavities of smaller diameter at the ends of said first named cavity in which the roll necks and stock for the wobblers are formed, said top cavity being of uniform diameter, a tangential gate passage for introducing molten metal to said bottom cavity, and a riser above said top cavity, said chill members being embedded in said sand body amound said first named cavity, a device for localizing hot tears in a casting formed in the mold to a region outside the casting proper between said top cavity and said riser, said device comprising *an orifice forming disc-like* transverse ring supported in said sand body between said top cavity and said riser and projecting a predetermined distance into the mold cavity, the distance of projection of said ring providing a diameter opening through the ring only slightly less than the diameter of said top cavity, whereby said ring creates a plane of weakness between the casting proper and the riser but does not stop flow of foreign material into the riser.

2. *In a mold for casting steel rolls including a bonded sand body and chill members, said sand body having an upright cylindrical cavity of relatively large diameter in which the roll body is formed, top and bottom cavities of smaller diameter at the ends of said first named cavity in which the roll necks and stock for the wobblers are formed, said top cavity being of uniform diameter, a tangential gate passage for introducing molten metal to said bottom cavity, and a riser above said top cavity, said chill members being embedded in said sand body around said first named cavity, a device for localizing hot tears in a casting formed in the mold to a region outside the casting proper between said top cavity and said riser, said device comprising an orifice forming disc-like transverse ring sup-*

*ported in said sand body between said top cavity and said riser at the crop-off plane and projecting a predetermined distance into the mold cavity, the distance of projection of said ring providing a diameter opening through the ring only slightly less than the diameter of said top cavity, whereby said ring creates a plane of weakness between the casting proper and the riser but does not stop flow of foreign material into the riser.*

ERWIN H. MEBS.

REFERENCES CITED

The following references are of record in the file of this patent or of the original patent.

UNITED STATES PATENTS

| Number | Name | Date |
|---|---|---|
| 900,970 | Washburn | Oct. 13, 1908 |
| 969,015 | Washburn | Aug. 30, 1910 |
| 1,071,809 | Seaman | Sept. 2, 1913 |
| 1,658,834 | Daniels et al. | Feb. 14, 1928 |
| 2,294,169 | Francis et al. | Aug. 25, 1942 |
| 2,377,731 | Walcher | June 5, 1945 |

OTHER REFERENCES

Metal Industry, December 27, 1946, pages 533 and 534.